US 9,197,716 B2
Nov. 24, 2015

(12) United States Patent
Igelka

(54) PRE-FETCHING RESOURCES BY PREDICTING USER ACTIONS

(71) Applicant: Or Igelka, Ramat Gan (IL)

(72) Inventor: Or Igelka, Ramat Gan (IL)

(73) Assignee: SAP SE, Walldorf (DE)

( * ) Notice: Subject to any disclaimer, the term of this patent is extended or adjusted under 35 U.S.C. 154(b) by 357 days.

(21) Appl. No.: 13/905,910

(22) Filed: May 30, 2013

(65) Prior Publication Data

US 2014/0359074 A1    Dec. 4, 2014

(51) Int. Cl.
- G06F 17/30 (2006.01)
- H04L 29/08 (2006.01)
- G06F 11/34 (2006.01)

(52) U.S. Cl.
CPC .............. H04L 67/32 (2013.01); G06F 11/34 (2013.01); G06F 17/30132 (2013.01); G06F 17/30902 (2013.01); H04L 67/22 (2013.01)

(58) Field of Classification Search
CPC ................... G06F 17/30132; G06F 17/30902; G06F 11/34; H04L 67/22
See application file for complete search history.

(56) References Cited

U.S. PATENT DOCUMENTS

| | | | |
|---|---|---|---|
| 5,680,573 A | 10/1997 | Rubin et al. | |
| 5,925,100 A | 7/1999 | Drewry et al. | |
| 5,946,647 A | 8/1999 | Miller et al. | |
| 6,055,569 A | 4/2000 | O'Brien et al. | |
| 6,728,726 B1 | 4/2004 | Bernstein et al. | |
| 6,996,680 B2 | 2/2006 | Mogi et al. | |
| 7,284,096 B2 | 10/2007 | Schreter | |
| 7,529,895 B2 | 5/2009 | Blumrich et al. | |
| 7,558,822 B2 | 7/2009 | Fredricksen et al. | |
| 7,941,609 B2 | 5/2011 | Almog | |
| 8,275,829 B2 | 9/2012 | Plamondon | |
| 8,326,830 B2 | 12/2012 | Hollingsworth | |
| 8,577,960 B2 | 11/2013 | Boller et al. | |
| 8,600,916 B2 | 12/2013 | Chen et al. | |
| 2004/0117398 A1 | 6/2004 | Idei et al. | |
| 2006/0069715 A1 | 3/2006 | Vayssiere | |
| 2010/0023925 A1 | 1/2010 | Shribman et al. | |
| 2010/0094878 A1* | 4/2010 | Soroca et al. | 707/748 |
| 2012/0089664 A1 | 4/2012 | Igelka | |
| 2012/0284080 A1 | 11/2012 | Oliveira et al. | |
| 2013/0007259 A1 | 1/2013 | Pacheco-Sanchez et al. | |
| 2013/0122934 A1* | 5/2013 | Branch et al. | 455/456.3 |
| 2013/0147820 A1* | 6/2013 | Kalai et al. | 345/522 |
| 2013/0167079 A1 | 6/2013 | Ari et al. | |
| 2013/0217332 A1* | 8/2013 | Altman et al. | 455/41.2 |

(Continued)

OTHER PUBLICATIONS

U.S. Appl. No. 13/362,206, filed Jan. 31, 2012 entitled "Unified Software Build System", 22 pages.

(Continued)

*Primary Examiner* — Le H Luu
(74) *Attorney, Agent, or Firm* — Fish & Richardson P.C.

(57) ABSTRACT

Pre-fetching resources by predicting user actions. Features of multiple users and of multiple client computer systems associated with the multiple users are obtained. From these features, multiple segments are generated, each including a proper subset of the multiple users. Users in the proper subset share a common feature. For a segment, resources that have at least a threshold level of likelihood of being requested by a user included in the segment are pre-fetched, i.e., obtained before the resources have been requested. A client computer system associated with the user in the included segment is identified, and the obtained resources are stored for providing to the user.

20 Claims, 2 Drawing Sheets

(56) References Cited

U.S. PATENT DOCUMENTS

2013/0254035 A1* 9/2013 Ramer et al. ............... 705/14.62
2014/0006951 A1* 1/2014 Hunter .......................... 715/719

OTHER PUBLICATIONS

Prefetching Resources—Make the Web Faster; 2 pages; https://developers.google.com/speed/articles/prefetching; Last visited Apr. 24, 2013.

White, Ryen et al., "Predicting Short-Term Interests Using Activity-Based Search Context", CIKM'10, Oct. 26-30, 2010, Toronto, Canada; 10 pages.

Su, Zhong et al. "What Next: A Prediction System for Web requests using N-gram Sequence Models", 8 pages http://research.microsoft.com/pubs/68790/prediction_web_requests.pdf; last visited May 21, 2013.

Su, Zhong et al., "A Prediction System for Multimedia Pre-fetching in Internet", 9 pages; Proceeding Multimedia '00 Proceedings of the eighth ACM international conference on Multimedia, pp. 3-11, ACM, Ney York, NY USA, ISBN: 1-58113-198-4.

Cunha, Carlos R. "Determining WWW User's Next Access and Its Application to Pre-fetching", Mar. 26, 1997, Computers and Communications, 1997. Proceedings., Second IEEE Symposium, pp. 6-11; IEEE 10.1109/ISCC.1997.615962.

* cited by examiner

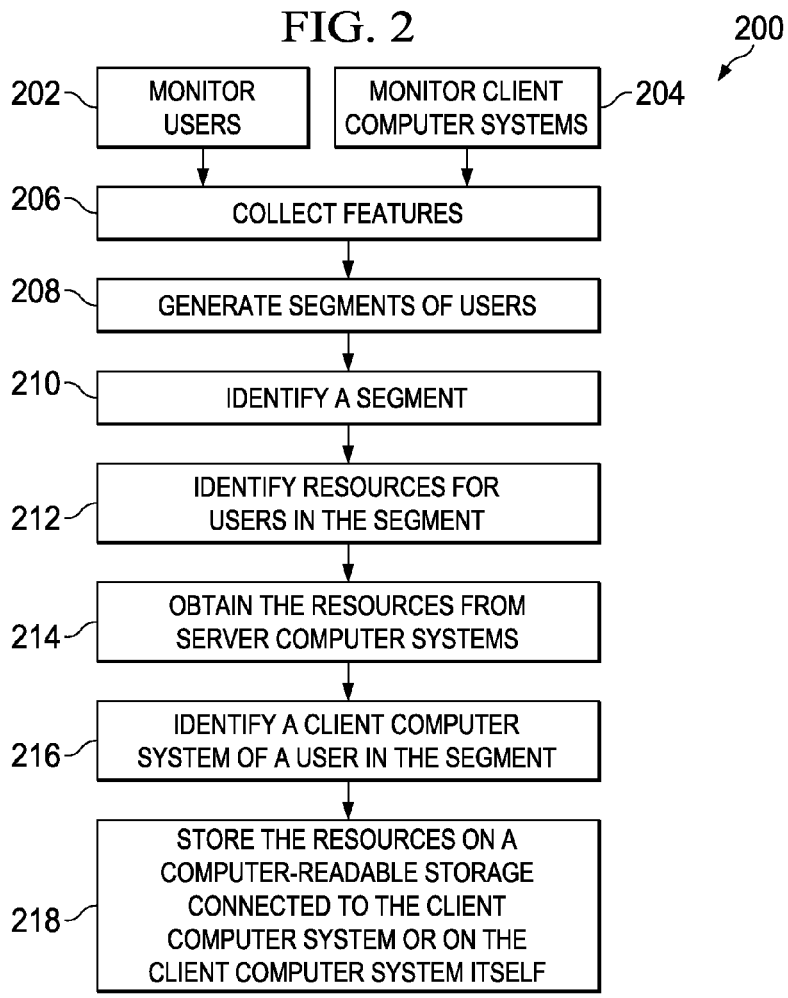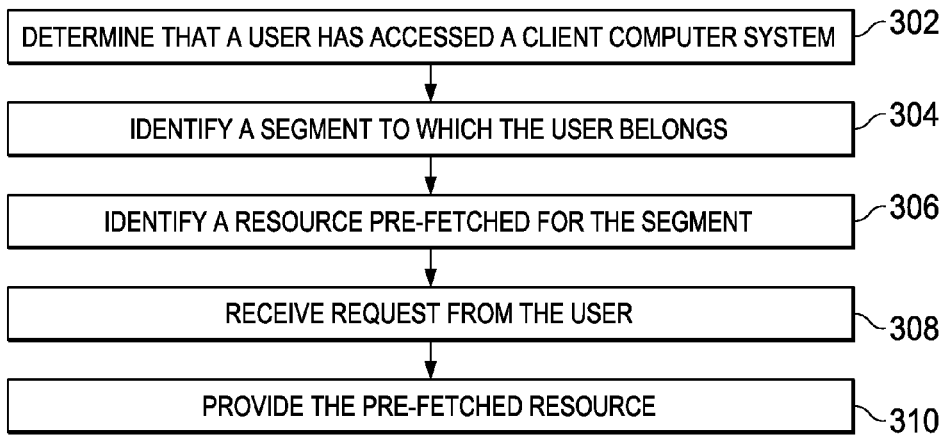

PRE-FETCHING RESOURCES BY PREDICTING USER ACTIONS

TECHNICAL FIELD

This disclosure relates to computer-implemented methods, computer-readable media, and computer systems for providing resources, for example, stored on server computer systems to client computer systems.

BACKGROUND

In a network environment that connects multiple server computer systems and multiple client computer systems, resources (e.g., images, video, audio, text, or any type of content) can be stored on one or more of the server computer systems. An example of such a network environment is the Internet. For example, a publisher of an Internet website can store resources included in the web pages of the website on a server computer system that hosts the website. The client computer systems can access the resources by transmitting requests for the content over a network that connects the server computer systems and the client computer systems, and receiving the responses in response to the requests. For example, a user of a client computer system can request resources hosted by the server computer system by visiting the website.

A speed at which a user of a client computer system receives a resource in response to a request for the resource can depend, in part, on the latency and/or the bandwidth of the network. For example, a speed at which a large movie file can be retrieved from the server computer system and presented on the client computer system can be slower compared to a speed at which a relatively smaller text file can be retrieved and presented. Moreover, a file stored locally on the client computer system can be presented to the user faster than if the same file were stored on the server computer system because a delay in transmitting a request for the file and receiving the file over the network can be eliminated. The speed can also depend on a network path between the client computer system and the server computer system. For example, if a number of network hops between the client computer system and the server computer system is low, then the speed at which the user's request is transmitted to the server computer system and the resource is transmitted to the client computer system is high.

BRIEF DESCRIPTION OF THE DRAWINGS

FIG. 2 is a flowchart of an example process for pre-fetching resources by predicting user actions.

FIG. 3 is a flowchart of an example process for providing pre-fetched resources.

Figure 1:
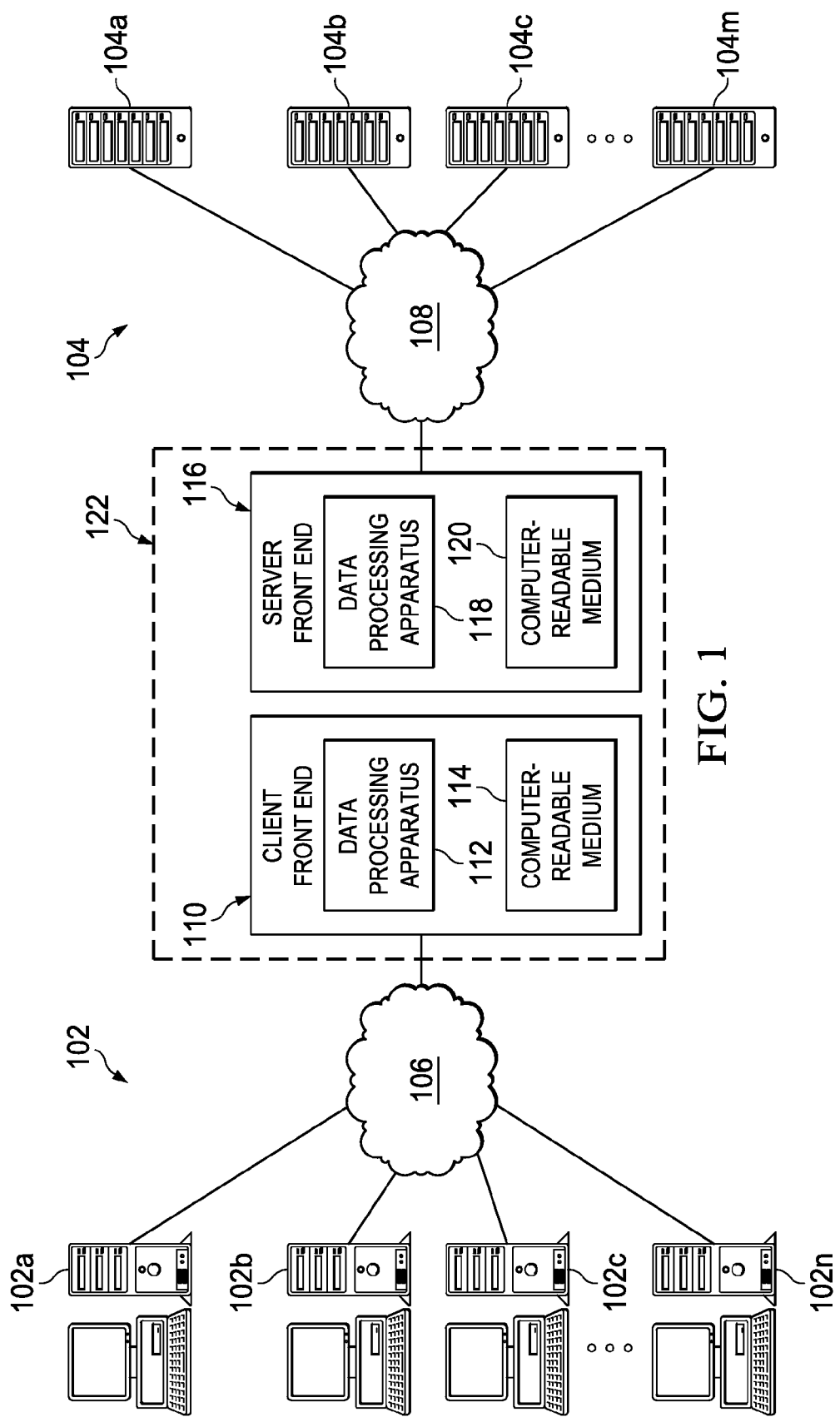
FIG. 1 illustrates an example of a computer system for pre-fetching resources by predicting user actions.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

Like reference numbers and designations in the various drawings indicate like elements.

DETAILED DESCRIPTION

This disclosure relates to computer-implemented methods, computer-readable media, and computer systems for pre-fetching resources by predicting user actions. One method to increase the speed at which a user associated with a client computer system can be provided with a resource that is relevant to the user is to pre-fetch the resource. That is, the resource is obtained from one or more server computer systems that host the resource before the user performs any user action associated with requesting the resource. The obtained resource is stored on a computer system, which, on a network path, is closer to the client computer system relative to the one or more server computer systems. For example, the resources can be stored on the client computer system itself. Operations performed to pre-fetch a resource in which the user is not interested can be wasteful. Moreover, presenting a resource that is not targeted to the user may negatively affect user experience.

A method to identify resources targeted to the user is to track the user over a period of time, e.g., by obtaining features that describe the user, monitoring the user's actions, and identifying past resources accessed by the user. A resource identified based on the user's features, the user's actions, or the past resources (or combinations of them) is highly likely to be relevant to the user. Such pre-fetched resources can be stored on the client computer system associated with the user, e.g., the client computer system by which the user accesses the network. In this manner, resources relevant to a single user can be pre-fetched.

This disclosure describes a method to implement pre-fetching resources at a larger scale based on features of multiple users. To do so, in some implementations, features that describe each of the multiple users are obtained by tracking each user and monitoring each user's actions. From among the multiple users, segments of users are created. Each segment can include users that share one or more common features. The segmenting can be based on recognition and analysis of patterns in users' activities, identification and segmentation of users according to features shared by the users, additional available information (e.g., location, movement data, browsing history, content/traffic analysis, or other suitable information), or combinations of them.

Resources relevant to a particular user can be pre-fetched based on the segmenting described above. A resource can be relevant to the user if the user explicitly requests the resource, e.g., by transmitting a request for the resource from the client computer system over the network. A resource can be determined to be relevant to the user based on certain features of the user, e.g., age, gender, location, physical attributes, interests, past requests for resources, associations (e.g., in clubs, societies or other associations), habits (e.g., reading, TV viewing or other habits), user actions (e.g., visiting stores, watching a particular TV station, listening to a particular radio station, or other actions) or combinations of them.

One of these segments is a subset of users who are similar to the particular user. Resources that were relevant to the users in the same subset as the particular user are more likely to be relevant to the particular user than resources that were not relevant to users in the same subset or resources that were relevant to users in different subsets. The particular user is likely to perform user actions that can be interpreted as requesting such resources. The resources are pre-fetched from the one or more server computer systems on which the resources are stored.

The pre-fetched resources can be stored on a computer-readable storage medium that, on the network path, is closer to a client computer system associated with the particular user than the server computer systems from which the resources are pre-fetched. A number of network hops from the client computer system to the computer-readable storage medium can be less than a number of network hops from the client computer system to the server computer system that stores the pre-fetched resources. Alternatively, or in addition, a speed at which the pre-fetched resources can be transmitted from the computer-readable storage medium to a client computer system can be faster than a speed at which the pre-fetched resources can be transmitted from the server computer system that stores the pre-fetched resources to the client computer system. In such situations, a route for the pre-fetched resources from the computer-readable storage medium to the client computer system may be longer, but faster than a route from the server computer system to the client computer system. The computer-readable storage medium can be included in the client computer system itself.

These techniques can similarly be implemented for one or more of the multiple users who access one or more of the client computer systems in the network environment. That is, resources that are targeted to one or more or each of the multiple users can be pre-fetched based, in part, on features of users in each segment. The pre-fetched resources can be stored on the computer-readable storage medium such as the one described above.

For example, a request can be received from a user for a first resource. From the features obtained as described above and based on the segment(s) in which the user is included, it can be determined that the user will request a second feature shortly after requesting the first feature. Before the user requests the second feature, the second feature can be pre-fetched and stored, for example, on a client computer system associated with the user. In this manner, the second resource, which is likely to be targeted to the user, can be pre-fetched before the user has requested the second resource.

As an alternative to or in addition to identifying and pre-fetching targeted resources, user actions that the particular user is likely to perform can be determined, e.g., based on features and actions of the particular user and other users in the same segment(s) as the particular user. For example, it can be determined that the users in the segment(s) in which the particular user is included are likely to view a particular television program and search for resources associated with the program, e.g., hosted by a website associated with the program, at the conclusion of the program. Actions that client computer systems would perform responsive to actions that the particular user or the other users in the segment(s) are likely to perform can be determined. For example, because the particular user is likely to search for resources associated with the program at the conclusion of the program, requests (e.g., search queries) for the resources can be generated before the particular user provides the requests, and resources that satisfy the requests (e.g., resources hosted by the website associated with the program) can be pre-fetched.

When the particular user provides a request, e.g., provides a search query requesting resources associated with the program, it can be determined if the particular user's request matches one of the previously generated requests or if one or more of the pre-fetched resources satisfy the particular user's request. If so, then the pre-fetched resources, which were determined to satisfy the previously generated requests or that satisfy the particular user's request, can be provided to the particular user. User actions can be monitored after resources have been pre-fetched to determine pre-fetched resources in which the particular user was interested and those in which the particular user was not interested. By learning the user actions after pre-fetching resources, the activity pattern recognition techniques, the action prediction techniques, and resource targeting techniques can be improved.

By implementing the techniques described preliminary preparative actions can be executed prior to a user's execution of user actions. The preparative actions can be determined based not only on a particular user's actions but also on the actions of multiple other users who share features in common with the particular feature. Doing so can provide a better response to the predicted actions of the user. For example, responses to the user's requests can be provided faster. The responses, e.g., web content prefetching, targeted content providing, can be more extensive and more accurate. From the segments into which the multiple users are divided, statistics can be collected for subsequent use, e.g., learning the same or new users' actions and improving the mechanism of activity pattern recognition for future prediction and pre-fetching.

FIG. 1 illustrates an example of a computer system for pre-fetching resources by predicting user actions. Multiple client computer systems 102 (e.g., a first client computer system 102a, a second client computer system 102b, a third client computer system 102c, an nth client computer system 102n) can be connected to multiple server computer systems 104 (e.g., a first server computer system 104a, a second server computer system 104b, a third server computer system 104c, an mth server computer system 104m) through one or more networks 106, 108, e.g., the Internet. A client computer system 102 can be any computer system that can exchange data with a server computer system 104 over a network. For example, the client computer system 102 can be a desktop computer, a laptop computer, a tablet computer, a smartphone, a personal digital assistant (PDA), or other suitable computers. A server computer system 104 can be any server that can store (e.g., host) resources and provide the resources to one or more of the client computer systems 102. For example, a server computer system 104 can be structurally similar to a client computer system or a distributed server that can store multiple resources on one computer or one resource across multiple computers or both. The server computer system 104 can be a website host that stores resources included in the web pages of the website, which provides the resources, e.g., when a user accesses the website.

In some implementations, the server computer systems 104 can be connected to a server front end 116. The server front end 116 can be a computer system that includes data processing apparatus 118 to execute computer instructions stored on a computer-readable medium 120. The server front end 116 can be disposed, on a network path, between the server computer systems 104 and the client computer systems 102. The server front end 116 can act, on one hand, as a client consuming network services from the server computer systems 104, and, on the other hand, as a server providing network services to a client front end 110.

The client front end 110 can be a computer system that includes data processing apparatus 112 to execute computer instructions stored on a computer-readable medium 114. The client front end 110 can be disposed, on the network path, between the server front end 116 and the client computer systems 102. The client front end 110 can act, one hand as a client consuming network services from the server front end 116, and, on the other hand, as a server providing the client computer systems 102 with network services that the client front end 110 consumes. Each of the client front end 110 and the server front end 116 acts as a reflector of respective network services that each consumes.

Thus, the client computer systems 102 and the client front end 110 are closer, on the network path, than the client computer systems 102 and the server front end 116. Similarly, the server computer systems 104 and the server front end 116 are closer, on the network path, than the server computer systems 104 and the client front end 110. This arrangement allows the server front end 116 to pre-fetch resources from the server computer systems 104 and the client front end 110 or the server front end 116 (or both) to store pre-fetched resources. The pre-fetched resources can be provided on one or more of the client computer systems 102 as described below.

The structures of the client front end 110 and the server front end 116 facilitate implementing the techniques described here. In particular, the client front end 110 and the server front end 116 are configured to track and monitor a large quantity (e.g., several thousands) of users or client computer systems 102 (or both) and pre-fetch resources from the server computer systems 104 that are targeted to each of the users. In addition, both front ends are configured to accelerate the transmission of pre-fetching requests and responses to such requests between the client computer systems 102 and the server computer systems 104. For example, the client front end 110 and the server front end 116 accelerate communications between the client computer systems 102 and the server computer systems 104 by caching resources (on both the client front end 110 and the server front end 116), by pre-fetching resources, by compressing the data that needs to be transferred from the server front end 116 to the client front end 110 (or vice versa). In addition, the client front end 110 and the server front end 116 also hold a common dictionary data structure. Each front end can have its own copy maintained in a similar way as the other front end. This can allow transmitting, in a first instance, a specific bit chunk from one front end to the other and then transmitting a key that identifies the specific bit chunk. In subsequent instances, one front end can transmit only the key (instead of the entire bit chunk), based on which the other front end can identify the specific bit chunk. Alternatively, the key can be calculated symmetrically by both the client front end 110 and the server front end 116 using the same algorithm on the bit chunks. In some implementations, the client front end 110 and the server front end 116 can be implemented as separate units, while, in others, the two front ends can be implemented as a single unit 122.

The client front end 110 can obtain features of multiple users and of multiple client computer systems 102 associated with the multiple users. Either the client front end 110 or the server front end 116 (or both) can generate multiple segments based on the obtained features. Each segment can include a proper subset of the multiple users. Users in the proper subset share a common feature included in the features. For a segment of the multiple segments, the server front end 116 can obtain, from one or more of the multiple server computer systems 104, resources that have at least a threshold level of likelihood of being requested by a user included in the segment before the resources have been requested by the user.

The client front end 110 can identify a client computer system (e.g., the first client computer system 102a) associated with the user included in the segment, and store the obtained resources on a computer-readable storage medium, e.g., the client front end 110 itself. The pre-fetched resources stored on the client front end 110 can be provided to the identified client computer system 102a. Details of the techniques described above and additional techniques implemented by either or both of the front ends are described below with reference to FIGS. 2 and 3.

FIG. 2 is a flowchart of an example process 200 for pre-fetching resources by predicting user actions. FIG. 3 is a flowchart of an example process 300 for providing pre-instructions stored on computer-readable media (for example, the computer-readable medium fetched resources. Each of the process 200 or the process 300 can be implemented as computer instructions stored on a computer-readable medium (for example, the computer-readable medium 114 or 120, or both, or by any other suitable computing device or system) and executable by data processing apparatus (for example, data processing apparatus 112 or 118, or both, or by any other suitable computing device or system). For example, each of the process 200 or the process 300 can be implemented by either the client front end 110 or the server front end 116 or both, as well as any other suitable system. For illustrative and example purposes, processes 200 and 300 are described with regard to example FIG. 1, although any suitable environment or system could be used to implement the idea.

At 202 and at 204, users of client computer systems (e.g., the client computer systems 102) and the client computer systems themselves, respectively, can be monitored. In some implementations, the client front end 110 can monitor both users of the client computer systems 102 and the client computer systems 102 associated with the users. For example, the client front end 110 can monitor each client computer system for a respective period of time (e.g., seconds, minutes, days, weeks, months). The client front end 110 can additionally monitor interactions between each user with each client computer system for the period of time. By doing so, the client front end 110 can identify the features based on each client computer system and the interactions. The client front end 110 can simultaneously implement the same or similar techniques for all the client computer systems 102.

At 206, features of the users or the client computer systems associated with the users or both can be collected. In some implementations, the client front end 110 can obtain features of the users such as those described above. Similarly, the client front end 110 can obtain features of the client computer systems 102, e.g., an Internet Protocol (IP) address, operating system executed by the client computer system, a browser (e.g., web browser, Internet browser) used by the client computer system, the resources stored on the server computer systems 104 which are accessed, queries (e.g., search queries) received through the client computer systems 102, responses to the queries, and other similar features.

For example, the client front end 110 can get a request from a user associated with a client computer system for a specific web page or a web service (or both). The client front end 110 can determine a source of the request and the requested resources, and identify a location of the requesting user. The client front end 110 can obtain this information or consumption or activity patterns, e.g., a period of time that the user spends viewing a web page, web pages that the user usually visits, or combinations of them, about the user and the client computer system. The client front end 110 can obtain this information after providing resources that satisfy the user's request or while processing the request to identify and provide the resources. The client front 100 can, alternatively or in addition, collect some or all of these features passively without having to process a request.

At 208, segments of users can be generated. In some implementations, either the client front end 110 or the server front end 116 or both can generate multiple segments based on the obtained features. As described above, each segment can include a proper subset of the multiple users. Users in the proper subset can share a common feature included in the features.

In the following steps, the server front end 116 can pre-fetch resources, as described above. At 210, a segment can be identified. In some implementations, for each user of the multiple users, the server front end 116 can identify users who share at least one common feature. For example, the server front end 116 can identify a first segment including a first proper subset of the multiple users, where users in the first proper subset share a first common feature (e.g., an age between 21 and 29). Further, the server front end 116 can identify a second segment including a second proper subset, where users in the second proper subset share a second common feature (e.g., females). The server front end 116 can identify several such segments. In addition, the server front end 116 can determine a third segment by intersecting the users in the first proper subset and the second proper subset, e.g., females of age between 21 and 29.

In this manner, an administrator at the server front end 116 can define categories for the segments. Each segment can have different resolutions, e.g., a high resolution in which all users share only one common feature or a low resolution in which all users share multiple common features. The server front end 116 can determine high resolution segments by determining intersections of low resolution segments as described above. The server front end 116 can create segments automatically or in response to input, e.g., from an administrator of the front end. Further, the server front end 116 can create the segments dynamically, i.e., as features of users and client computer systems are being gathered, and periodically update the segments as additional features are gathered.

At 212, resources for users in the segment can be identified, and at 214 the resources can be obtained from server computer systems. In some implementations, the client front end 110 can expect a particular user or other users (e.g., users in the same segment as the particular user) to request resources in the near future, and decide to request some or all of the resources from the server front end 116. The two front ends can obtain the resources by accelerating transmission of the resources from the server computer systems to client computer systems through them. To accelerate transmission, the server front end 116 can compress resources received from the server computer systems 104, and transmit the compressed resources to the client front end 110. Either the server front end 116 or the client front end 110 or both can implement caching mechanisms to store the resources or compressed resources, or both.

In some implementations, acceleration can include implementation, by the two front ends, of a dictionary data structure. In such implementations, the client front end 110 and the server front end 116 are synchronized with keys and values. Keys include short blocks of data, while values include relatively longer blocks of data. To communicate resources, the server front end 116 can transmit a key (i.e., a short block of data) to the client front end 110. The client front end 110 can identify the corresponding value (i.e., the longer block of data) using the dictionary data structure.

At 216, a client computer system of a user in the segment can be identified, and, at 218, the pre-fetched resources can be stored. For example, for each user of the multiple users, either the client front end 110 or the server front end 116 or both can store pre-fetched resources relevant to each user in a computer-readable storage medium, e.g., on the client front end 110 itself or on one or more client computer systems associated with the user, or on combinations of them.

As described below, when a user of a client computer system performs an action interpreted as a request for a pre-fetched resource, the pre-fetched resource can be obtained from the client front end 110 faster than it would have been obtained if the resource hadn't been pre-fetched, and faster than it would have been obtained if the client computer system would have requested the resource directly from the server computer systems 104. At 302, it can be determined that a user has accessed a client computer system. At 304, a segment to which the user belongs can be identified. At 306, resources pre-fetched for the segment can be identified. At 308, a request can be received from the user. At 310, the pre-fetched resource can be provided to the user.

In some implementations, the client front end 110 can determine that the user has accessed the client computer system. For example, the client front end 110 can determine that the user has accessed a web page of a website using an Internet browser. The client front end 110 can determine that the user has requested an obtained (i.e., pre-fetched) resource. For example, the client front end 110 can determine that the user has executed a search query to which a pre-fetched resource would have been determined as being relevant by a search engine. The client front end 110 can provide the obtained resource in response to determining that the user has requested the obtained resource.

The user described above can be a first user. The client front end 110 can determine that a second user has accessed the client computer system after the first user. The first user and the second user can be included in the same segment. The client front end 110 can identify resources accessed by the first user in the example implementations described above. The client front end 110 can obtain resources similar to the identified resources before receiving a request for the obtained resources from the second user. The client front end 110 can store the obtained (i.e., pre-fetched) resources on either the client front end 110 or the identified client computer system (or combinations of them) for providing them to the second user.

In some implementations, the client front end 110 can become aware of a user's actions, predict the user's subsequent action or actions, and execute responses to the subsequent action or actions. For example, the client computer system 110 can determine that the user has accessed a client computer system. Before receiving a request from the user, the client computer system 110 can determine a request that has at least a threshold level of likelihood of being received from the user. The client front end 110 can determine the request based one or more features of users in the segment in which the user is included or based on past actions of the user (or combinations of them). The client front end 110 and the server front end 116 can implement techniques such as those described above to pre-fetch resources that satisfy the determined request. The client front end 110 can store the pre-fetched resources.

Subsequently, the client front end 110 can receive the request for resources from the user. The client front end 110 can determine that the received request substantially matches the determined request that has at least the threshold level of likelihood (e.g., probability) of being received from the user. The client front end 110 can provide the obtained (i.e., pre-fetched) resources stored in client front end 110 (or, in some situations, on the identified client computer system) in response to receiving the user's request for these resources. The client front end 110 can learn or update the known usage patterns of the user or the segment or segments in which the user is included (or both) during or after implementing the techniques described above. By doing so, the client front end 110 and the server front end 116 can continuously improve their performances for future segmentation, prediction, and preparation.

In some implementations, a client computer system (e.g., the first client computer system 102a) can be associated with (e.g., connected to) a content capturing device. The first client computer system 102a can receive a digital image of the user from the content capturing device. For example, the content capturing device can be a digital camera that is connected to (e.g., incorporated in) the first client computer system 102a. As the user begins to use or approaches the first client computer system 102a, the digital camera can capture an image of all or parts of the user and provide the image to the client front end 110.

The client front end 110 can analyze the digital image to identify physical attributes of the user, e.g., that the user is blonde. The client front end 110 and the server front end 116 can implement the techniques described above to pre-fetch resources associated with (i.e., relevant to) the user, and store the pre-fetched resources (e.g., in the client front end 110 or the client computer system). The pre-fetched resource can be an advertisement for a shampoo dedicated for light-colored hair. When the client front end 110 determines that the user has accessed the identified client computer system (e.g., is sufficiently physically close to the client computer system or has provided an input to the client computer system), then the client front end 110 can present the obtained resources. The physical attributes can extend beyond a physical appearance of the user to, e.g., items of clothing that the user is wearing or carrying. Further, the techniques described above can be implemented by identifying physical attributes of a first user and presenting the pre-fetched resources to a second user who shares one or more of the physical attributes with the first user.

In some implementations, the client front end 110 can predict database queries based on prior queries, for example. By doing so, the client front end 110 can increase a speed at which database records can be accessed, which, in turn, can improve a performance of the database, e.g., an in-memory database.

Sometimes, the multiple server computer systems 104 and the multiple client computer systems 102 can be implemented in an enterprise environment. One or more users who are associated with the client computer systems 102 can have a respective role in the enterprise. Resources stored on the multiple server computer systems 104 can be enterprise resources. The client front end 110 can determine that the user has accessed a client computer system (e.g., the second client computer system 102b). The client front end 110 can determine a role in the enterprise associated with the user. The client front end 110 can determine the user's role in the enterprise, e.g., when the user accesses an enterprise portal using the user's credentials. The client front end 110 can obtain, from one or more of the multiple server computer systems 104, enterprise resources associated with the role of the user. The client front end 110 and the server front end 116 can identify resources that have been previously accessed by users having the same role, and pre-fetch the identified resources. The client front end 110 can store the obtained enterprise resources before receiving a request from the user. In some situations, the server front end 116 which communicates with the client front end 110 can store the obtained enterprise resources. When another client front end 110 (or the same client front end 110) requests the enterprise resources subsequently, the server front end 116 can provide the stored enterprise resources to the client front end 110. In this manner, the server front end 116 can avoid asking the server computer systems 104 for the resources multiple times, e.g., once per each client front end's request.

As described above, the client front end 110 and the server front end 116 can monitor user actions associated with the pre-fetched resources to learn about the user actions and improve the pre-fetching mechanisms. For example, the client front end 110 can monitor accessing of an obtained (i.e., pre-fetched) resource by respective one or more users included in a segment using one or more client computer systems. The client front end 110 and the server front end 116 can modify future instances of pre-fetching and providing the resource to users included in the segment in response to monitoring the accessing.

To monitor the accessing, the client front end 110 can determine metrics associated with the accessing of the obtained resource. The metrics can include at least one of a number of times the obtained resource was accessed by a user or a period of time for which the obtained resource was accessed or dates/times at which the user accessed the obtained resource. From the metrics, the client front end 110 and the server front end 116 can identify statistics that provide meaningful information regarding a usefulness of pre-fetching a particular resource for multiple users. An example of modifying future instances of providing the obtained resource to users included in the segment includes providing a recommendation to a publisher of the obtained resource to either keep or modify the obtained resource based on the metrics.

To learn and improve the usefulness of pre-fetching, the client front end 110 can collect data of the usage of the pre-fetched resources by multiple users rather than just one user. The server front end 116 can supply the demands of multiple client front ends including the client front end 110. Similarly, multiple server front ends including the server front end 116 can be implemented to aggregate data describing users and client computer systems, analyze the aggregated data, and utilize the data for pre-fetching or improving pre-fetching or both. Implementing acceleration (e.g., by compression and caching) using, e.g., the dictionary data structure, can further improve pre-fetching. Performing the aforementioned techniques can enable improving pre-fetching on a larger scale relative to implementing pre-fetching for a single user or a single client computer system.

The techniques described above as being implemented by a client front end 110 can be implemented by the server front end 116, and vice versa. Also, the techniques implemented by one of the front ends can be implemented by both front ends in combination.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) or a LED (Light Emitting Diode) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system implemented in a network environment that connects a plurality of server computer systems and a plurality of client computer systems, the system comprising:
   data processing apparatus; and
   a computer-readable medium storing instructions executable by data processing apparatus to perform operations comprising:
      obtaining features of a plurality of users and of a plurality of client computer systems associated with the plurality of users;
      generating a plurality of segments based on the obtained features, each segment including a proper subset of the plurality of users, wherein users in the proper subset share a common feature included in the features; and
      for a segment of the plurality of segments:
         obtaining, from one or more of the plurality of server computer systems, resources that have at least a threshold level of likelihood of being requested by a user included in the segment before the resources have been requested by the user;
         identifying a client computer system associated with the user included in the segment; and
         storing the obtained resources for providing to the user.

2. The system of claim 1, wherein storing the obtained resources for providing to the user comprises storing the obtained resources on a computer-readable storage connected to the identified client computer system or on the identified client computer system, the operations further comprising:
   determining that the user has accessed the identified client computer system;
   determining that the user has requested an obtained resource; and
   providing the obtained resource stored in the computer-readable storage medium or on the identified client computer system in response to determining that the user has requested the obtained resource.

3. The system of claim 2, wherein the user is a first user, the operations further comprising:
   determining that a second user has accessed the identified client computer system after the first user, wherein the first user and the second user are included in the same segment;
   identifying resources accessed by the first user when the first user accessed the identified client computer system;
   obtaining resources similar to the identified resources before receiving a request for the obtained resources from the second user; and
   storing the obtained resources for providing to the second user.

4. The system of claim 1, the operations further comprising:
   determining that the user has accessed the identified client computer system;
   before receiving a request for resources from the user, determining a request that has at least a threshold level of likelihood of being received from the user based on one or more features of the subset of the plurality of users included in a segment in which the user is included;
   obtaining, from one or more of the plurality of server computer systems, resources that satisfy the determined request; and
   storing the obtained resources on a computer-readable storage connected to the identified client computer system or on the identified client computer system.

5. The system of claim 4, the operations further comprising:
   receiving the request for resources from the user;
   determining that the received request substantially matches the determined request that has at least the threshold level of likelihood of being received from the user; and
   providing the obtained resources in response to receiving the request for resources.

6. The system of claim 1, the operations further comprising:

receiving a digital image of the user from a content capturing device that captures the digital image of the user, the content capturing device associated with the identified client computer system;

analyzing the digital image to identify physical attributes of the user;

obtaining, from one or more of the plurality of server computer systems, resources associated with the identified physical attributes;

storing, on a computer-readable storage connected to the identified client computer system or on the identified client computer system, the obtained resources;

determining that the user has accessed the identified client computer system; and presenting the obtained resources in response to determining that the user has accessed the identified client computer system.

7. The system of claim 1, wherein the plurality of server computer systems and the plurality of client computer systems are implemented in an enterprise environment, each user of the plurality of users has a respective role in the enterprise, and resources stored on the plurality of server computer systems are enterprise resources, the operations further comprising:

determining that the user has accessed the identified client computer system;

determine a role in the enterprise associated with the user;

obtaining, from one or more of the plurality of server computer systems, enterprise resources associated with the role of the user; and storing, on a computer-readable storage connected to the identified client computer system or on the identified client computer system, the obtained enterprise resources before receiving a request from the user.

8. The system of claim 1, wherein obtaining the features of the plurality of users and of the plurality of client computer systems associated with the plurality of users comprises:

monitoring each client computer system for a respective period of time;

monitoring interactions between each user with each client computer system for the period of time; and identifying the features based on each client computer system and the interactions.

9. The system of claim 1, wherein generating the plurality of segments comprises:

identifying a first segment including a first proper subset, wherein users in the first proper subset share a first common feature;

identifying a second segment including a second proper subset, wherein users in the second proper subset share a second common feature; and determining a third segment by intersecting the users in the first proper subset and the second proper subset.

10. The system of claim 1, wherein obtaining the resources from one or more of the plurality of server computer systems comprises accelerating transmission of the resources from the one or more of the plurality of server computer systems to the identified client computer system.

11. The system of claim 1, the operations further comprising:

monitoring accessing of an obtained resource stored on the identified client computer system by respective one or more users who use the identified client computer system; and modifying future instances of providing the obtained resource to users included in the segment in response to monitoring the accessing.

12. The system of claim 11, wherein monitoring the accessing of the obtained resource comprises determining metrics associated with the accessing of the obtained resource, the metrics including at least one of a number of times the obtained resource was accessed by a user, a period of time for which the obtained resource was accessed by the user, or dates/times that the user accessed the obtained resource.

13. The system of claim 12, wherein modifying future instances of providing the obtained resource to users included in the segment in response to monitoring the accessing comprises providing a recommendation to a publisher of the obtained resource to either keep or modify the obtained resource based on the determined metrics.

14. A method implemented in a network environment that connects a plurality of server computer systems and a plurality of client computer systems, the method comprising:

obtaining features of a plurality of users and of a plurality of client computer systems associated with the plurality of users;

generating a plurality of segments based on the obtained features, each segment including a proper subset of the plurality of users, wherein users in the proper subset share a common feature included in the features; and for a segment of the plurality of segments:

obtaining, from one or more of the plurality of server computer systems, resources that have at least a threshold level of likelihood of being requested by a user included in the segment before the resources have been requested by the user;

identifying a client computer system associated with the user included in the segment; and storing the obtained resources for providing to the user.

15. The method of claim 14, wherein storing the obtained resources for providing to the user comprises storing the obtained resources on a computer-readable storage connected to the identified client computer system or on the identified client computer system, the method further comprising:

determining that the user has accessed the identified client computer system;

determining that the user has requested an obtained resource stored on the computer-readable storage connected to the identified client computer system or on the identified client computer system; and providing the obtained resource in response to determining that the user has requested the obtained resource.

16. The method of claim 15, wherein the user is a first user, further comprising:

determining that a second user has accessed the identified client computer system after the first user, wherein the first user and the second user are included in the same segment;

identifying resources accessed by the first user when the first user accessed the identified client computer system;

obtaining resources similar to the identified resources before receiving a request for the obtained resources from the second user; and storing the obtained resources on the computer-readable storage connected to the identified client computer system or on the identified client computer system for providing to the second user.

17. The method of claim 14, wherein generating the plurality of segments comprises:

identifying a first segment including a first proper subset, wherein users in the first proper subset share a first common feature;

identifying a second segment including a second proper subset, wherein users in the second proper subset share a second common feature; and determining a third segment by intersecting the users in the first proper subset and the second proper subset.

18. A non-transitory computer-readable medium storing instructions executable by data processing apparatus to perform operations comprising:

obtaining features of a plurality of users and of a plurality of client computer systems associated with the plurality of users;

generating a plurality of segments based on the obtained features, each segment including a proper subset of the plurality of users, wherein users in the proper subset share a common feature included in the features; and for a segment of the plurality of segments:
obtaining, from one or more of the plurality of server computer systems, resources that have at least a threshold level of likelihood of being requested by a user included in the segment before the resources have been requested by the user;

identifying a client computer system associated with the user included in the segment; and storing the obtained resources for providing to the user.

19. The medium of claim 18, wherein storing the obtained resources for providing to the user comprises storing the obtained resources on a computer-readable storage connected to the identified client computer system or on the identified client computer system, the operations further comprising:

determining that the user has accessed the identified client computer system;

before receiving a request for resources from the user, determining a request that has at least a threshold level of likelihood of being received from the user based on one or more features of the subset of the plurality of users included in a segment in which the user is included;

obtaining, from one or more of the plurality of server computer systems, resources that satisfy the determined request;

storing the obtained resources on the computer-readable storage connected to the identified client computer system or on the identified client computer system;

receiving the request for resources from the user;

determining that the received request substantially matches the determined request that has at least the threshold level of likelihood of being received from the user; and providing the obtained resources in response to receiving the request for resources.

20. The medium of claim 18, the operations further comprising:

determining metrics associated with accessing of the obtained resource, the metrics including at least one of a number of times the obtained resource was accessed by a user or a period of time for which the obtained resource was accessed by the user; and modifying future instances of providing the obtained resource to users included in the segment in response to determining the metrics by providing a recommendation to a publisher of the obtained resource to either keep or modify the obtained resource based on the determined metrics.

* * * * *